US010302755B2

(12) United States Patent
Harris

(10) Patent No.: US 10,302,755 B2
(45) Date of Patent: May 28, 2019

(54) TRACKING APPARATUS AND METHOD FOR AIRBORNE TARGETS

(71) Applicant: SpotterRF LLC, Orem, UT (US)

(72) Inventor: Logan Carl Harris, Orem, UT (US)

(73) Assignee: SPOTTERRF LLC, Orem, UT (US)

( * ) Notice: Subject to any disclaimer, the term of this patent is extended or adjusted under 35 U.S.C. 154(b) by 1325 days.

(21) Appl. No.: 14/282,829

(22) Filed: May 20, 2014

(65) Prior Publication Data

US 2017/0102460 A1    Apr. 13, 2017

(51) Int. Cl.
*G01S 7/41* (2006.01)
*H01Q 3/08* (2006.01)
*G01S 13/02* (2006.01)
*G01S 13/72* (2006.01)

(52) U.S. Cl.
CPC ............... *G01S 13/72* (2013.01); *G01S 7/411* (2013.01); *G01S 13/0209* (2013.01); *H01Q 3/08* (2013.01)

(58) Field of Classification Search
CPC ...... G01S 13/72; G01S 7/411; G01S 13/0209; H01Q 3/08
USPC .......................................................... 342/21
See application file for complete search history.

(56) References Cited

U.S. PATENT DOCUMENTS

| | | | | |
|---|---|---|---|---|
| 5,025,262 A | * | 6/1991 | Abdelrazik | H01Q 1/28 343/705 |
| 2007/0194976 A1 | * | 8/2007 | Reed | G01S 7/024 342/22 |
| 2010/0026490 A1 | * | 2/2010 | Butler | G08B 13/2494 340/552 |
| 2011/0074620 A1 | * | 3/2011 | Wintermantel | G01S 7/032 342/70 |

* cited by examiner

*Primary Examiner* — Frank J McGue
(74) *Attorney, Agent, or Firm* — Kunzler Bean & Adamson

(57) ABSTRACT

A method for determining location information for an airborne target includes synthesizing a cyclic transmit signal, transmitting an electromagnetic beam corresponding to the cyclic transmit signal, providing a plurality of vertically offset return signals corresponding to at least two receive antennas that are vertically offset, down-converting the plurality of vertically offset return signals with the cyclic transmit signal to provide a corresponding plurality of baseband signals, determining magnitude and phase information for each vertically offset return signal as a function of range from the corresponding baseband signal, and determining elevation information for an airborne target from the magnitude and phase information. Azimuthal information for the airborne target may be determined by tracking amplitude variations in the return signal in response to azimuthal rotation of the receive antennas. A corresponding apparatus, system, and computer readable medium are also disclosed herein.

17 Claims, 5 Drawing Sheets

D = Receive Antenna Spacing $\Delta\phi$ = Phase Difference for Return Signals $\theta_T = \sin^{-1}\left(\frac{\lambda \cdot \Delta\phi}{2\pi \cdot D}\right)$

TRACKING APPARATUS AND METHOD FOR AIRBORNE TARGETS

BACKGROUND OF THE INVENTION

Field of the Invention

The subject matter disclosed herein relates to radar systems in general and to ground-based radar systems for tracking airborne targets in particular.

Description of the Related Art

With the increasing prevalence of air traffic for commerce and travel as well as potential airborne threats such as missiles, hostile aircraft, and unmanned aerial vehicles, the ability to spot and track airborne targets is an important aspect of providing security and defense in military, commercial, and homeland security environments. However, despite the increasing need, the cost of such systems is often prohibitive. Therefore, what is needed are low-cost systems and methods to detect and track airborne targets.

SUMMARY OF THE INVENTION

The present invention has been developed in response to the present state of the art, and in particular, in response to the problems and needs in the art that have not yet been fully solved by currently available radar systems. Accordingly, the present invention has been developed to provide a method, apparatus, and computer readable medium for determining location information for an airborne target that overcome shortcomings in the art.

For example, a method for determining location information for an airborne target includes synthesizing a cyclic transmit signal, transmitting an electromagnetic beam corresponding to the cyclic transmit signal, providing a plurality of vertically offset return signals corresponding to at least two receive antennas that are vertically offset, down-converting the plurality of vertically offset return signals with the cyclic transmit signal to provide a corresponding plurality of baseband signals, determining magnitude and phase information for each vertically offset return signal as a function of range from the corresponding baseband signal, and determining elevation information for an airborne target from the magnitude and phase information. Azimuthal information for the airborne target may be determined by tracking amplitude variations in the return signal in response to azimuthal rotation of the receive antennas. A corresponding apparatus and system are also disclosed herein. Furthermore, the methods described herein may be embodied as a non-transitory computer program product or computer readable medium comprising computer executable instructions that are configured to conduct the described methods.

It should be noted that references throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 1b is a front view diagram of an antenna panel suitable for use within the tracking system of FIG. 1a;

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Figure 1A:
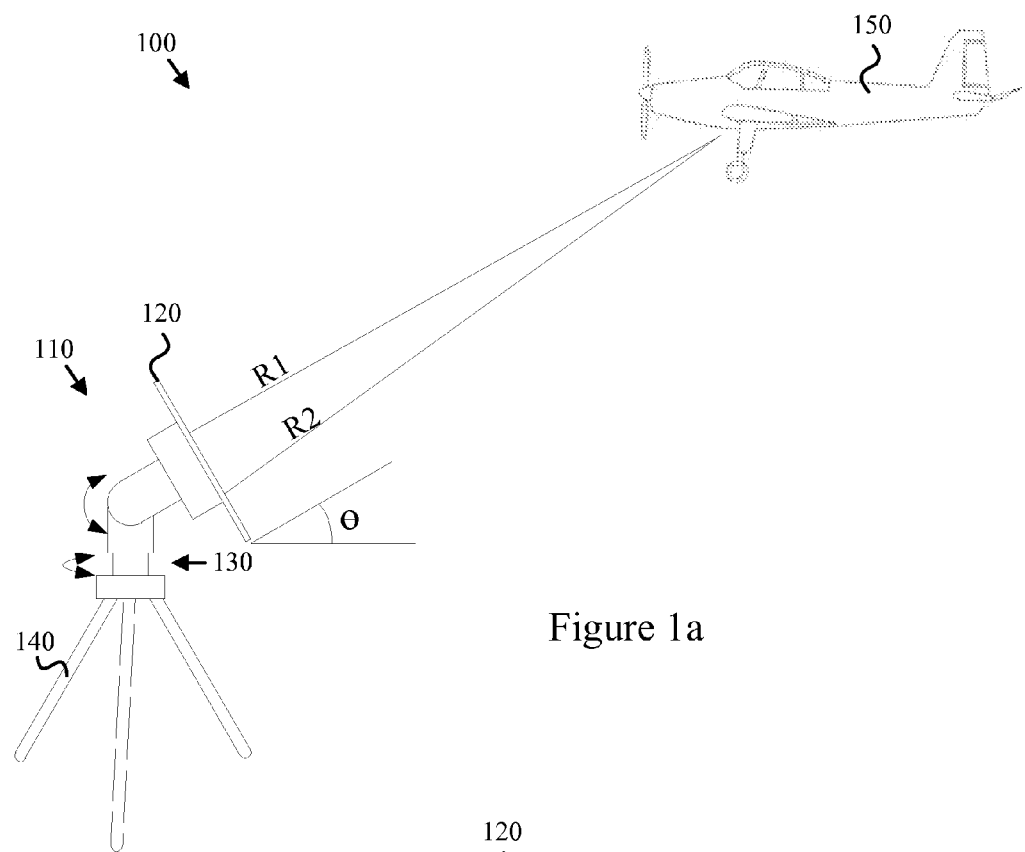
FIG. 1a is a schematic diagram illustrating one example of a tracking system for airborne targets.

FIG. 1a is a schematic diagram illustrating one example of a tracking system 100 for airborne targets. As depicted, the tracking system 100 includes a tracking antenna 110 and an airborne target 150. The tracking system 100 may also include one or more processing and/or control units (not shown) that process signals provided by the tracking antenna 110 and control the orientation of the tracking antenna 110.

The tracking antenna 110 may include an antenna panel 120 attached to a multi-axis gimbal 130 which is mounted on a stand such as a tripod 140. In the depicted embodiment, the multi-axis gimbal 130 enables azimuthal (i.e., horizontal) and elevational (i.e., vertical) rotation of the antenna panel 120.

Figure 1B:
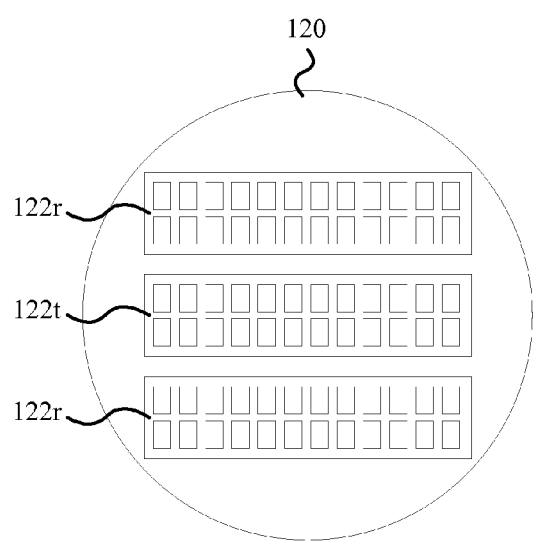

As shown in FIG. 1b, the antenna panel 120 may include an antenna array 122 with one or more transmit antennas 122t and multiple receive antennas 122r. The receive antennas 122r are vertically offset to facilitate interferometric detection of the elevation of the airborne target 150. The azimuthal and elevational orientation of the antenna panel 120 may be adjusted to track the airborne target 150.

Figure 2:
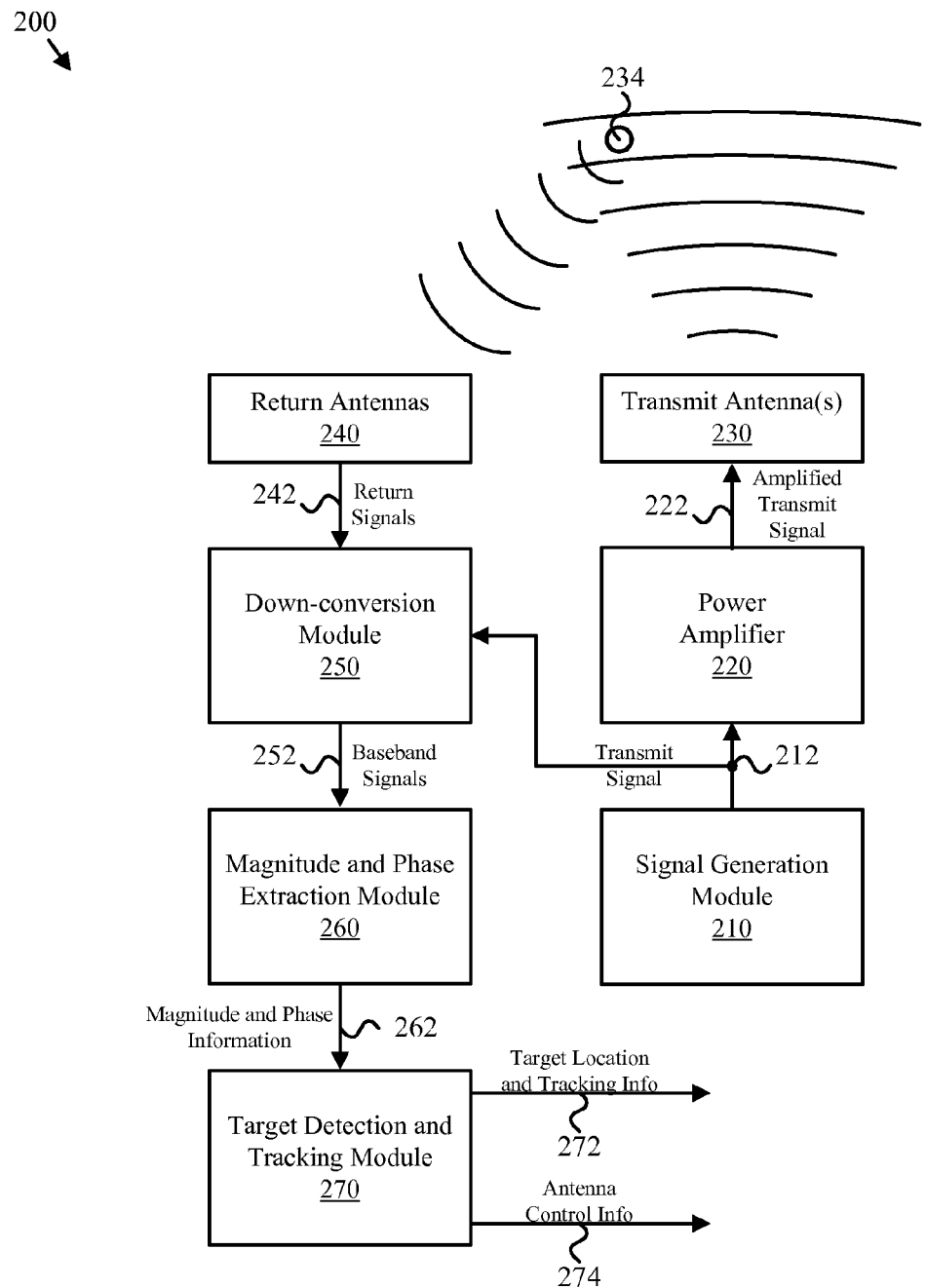
FIG. 2 is a block diagram depicting one embodiment of a target tracking apparatus.

FIG. 2 is a block diagram depicting one embodiment of a target tracking apparatus 200. As depicted, the target tracking apparatus 200 includes a signal generation module 210, a power amplifier 220, one or more transmit antennas 230, two or more return antennas 240, a down-conversion module 250, a magnitude and phase extraction module 260, and a target detection and tracking module 270. The target tracking apparatus 200 enables detection and tracking of airborne targets.

The signal generation module 210 generates a transmit signal 212. The transmit signal 212 may be a continuous cyclic chirp signal whose rate of frequency change is substantially constant within a chirp cycle. In one embodiment, the rate of frequency change for the transmit signal 212 varies less than 20 milli-radians over an operating period of 5 seconds. In some embodiments, the transmit signal is up-converted from a synthesized signal. In other embodiments, the transmit signal is directly synthesized. The frequency of the transmit signal may be selected to facilitate detection of airborne targets. For example, in certain embodiments the operational frequency may be between 9.5 and 11 GHz.

The power amplifier 220 amplifies the transmit signal 212 to provide the amplified transmit signal 222 to the transmit antenna(s) 230. The transmit antenna(s) 230 radiate an electromagnetic beam corresponding to the amplified transmit signal 222. In one embodiment, the radiated electromagnetic beam spans more than 30 degrees in elevation and less than 12 degrees in azimuth. Radiating a beam that is relatively narrow in azimuth may facilitate determining the azimuthal position of a target by tracking amplitude variations in the return signal, or the signal corresponding thereto, in response to azimuthal rotation of the receive/return antennas 240.

Each return antenna 240 receives electromagnetic energy reflected by elements in the surrounding environment such as a target 234 and provides a return signal 242. The down-conversion module 250 down-converts each return signal 242 to provide a corresponding baseband signal 252. The magnitude and phase extraction module 260 extracts magnitude and phase information from each baseband signal 252 to provide magnitude and phase information 262.

The target detection and tracking module 270 processes the magnitude and phase information 262 to provide target location and tracking information 272 and antenna control information 274. The target location and tracking information 292 may be presented to a user and also used to update the antenna control information 274 and focus the transmitted beam on the target 234. For example, the target location and tracking information 292 may be overlaid on a map along with a (highlighted) movement path for the airborne target.

In some embodiments, the target detection and tracking module 270 includes a behavior filter (not shown) that observes the movements of potential targets including micro-doppler movements and determines if the potential target is not an aircraft. For example, the behavior filter may use potential target information such as speed, heading, heading pattern and duration, vibration patterns, altitude, and radar cross section to determine if the potential target is a non-aircraft object such as a bird or a treetop. The target detection and tracking module 270 may also use the foregoing potential target information or the like to classify the type of aircraft that the airborne target is. The potential target information and classification information may be included in the target location and tracking information 272.

Figure 3:
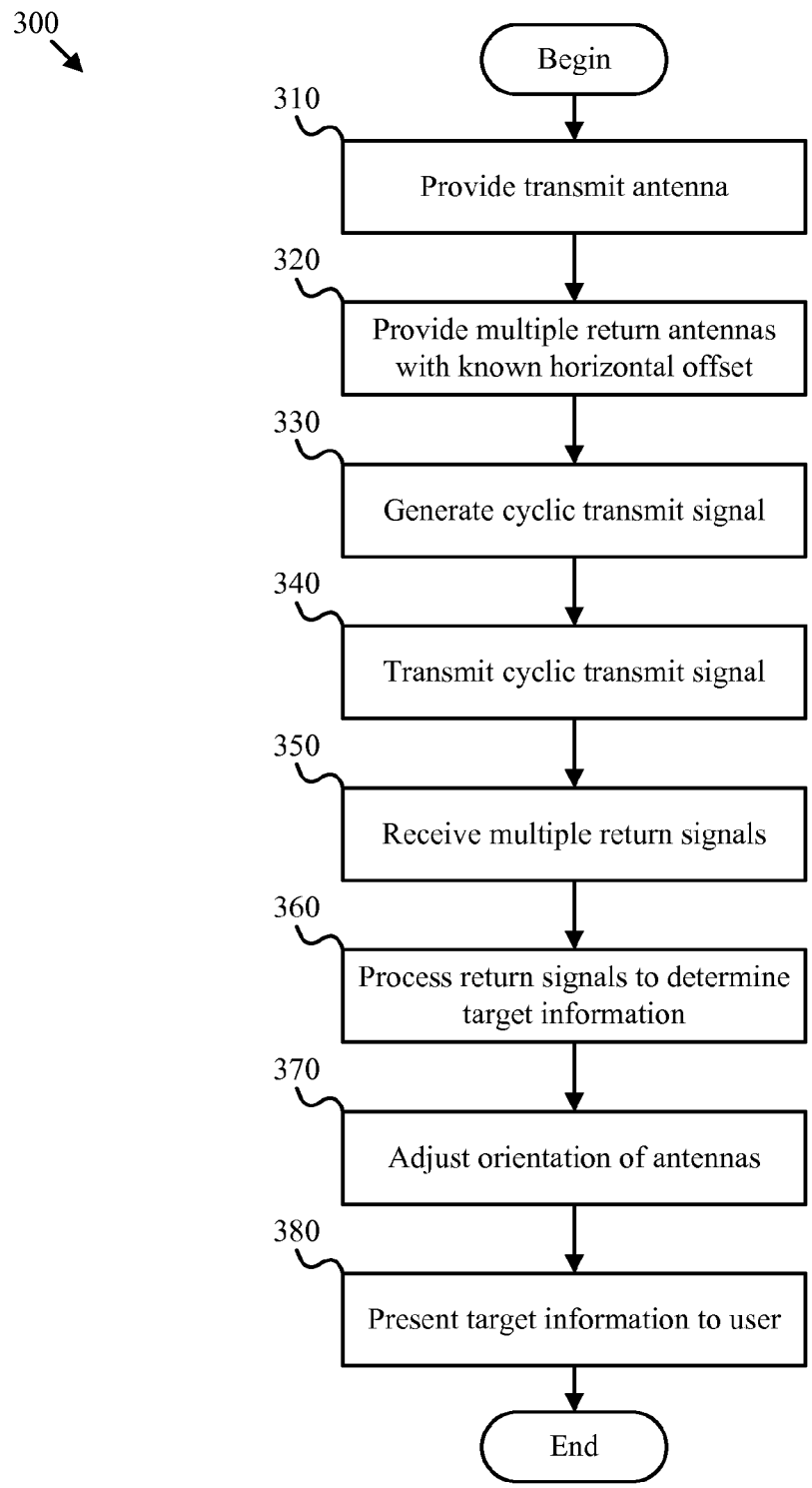
FIG. 3 is a flowchart diagram depicting one embodiment of a target tracking method.

FIG. 3 is a flowchart diagram depicting one embodiment of a target tracking method 300. As depicted, the target tracking method 300 includes providing 310 a transmit antenna, providing 320 multiple return antennas, generating 330 a cyclic transmit signal, transmitting 340 the cyclic transmit signal, receiving 350 multiple return signals, processing 360 the return signals, adjusting 370 the orientation of the antennas, and presenting 380 target information to a user. The target tracking method 300 may be conducted in conjunction with the target tracking apparatus 200 or the like.

Providing 310 a transmit antenna may include providing an antenna that emits a beam pattern that illuminates a portion of the horizon in a security environment. For example, the beam pattern may be relatively wide in the horizontal direction and relatively shallow in the vertical direction.

Providing 320 multiple return antennas may include providing conventional or printed circuit antennas that are offset by a known distance in order to accurately calculate the source positions of reflections captured by the return antennas.

Generating 330 a cyclic transmit signal may include generating a cyclic chirp signal. The cyclic transmit signal may have an operational frequency that is selected for detection and tracking of airborne targets. In one embodiment, the cyclic transmit signal is a chirp signal that cycles between 9.5 and 11 GHz.

Transmitting 340 the cyclic transmit signal may include radiating electromagnetic energy whose amplitude corresponds to the cyclic transmit signal. Receiving 350 multiple return signals may include receiving signals provided by a set of receive antennas.

Processing 360 the return signals may include processing the signals provided by the receive antennas to determine the location of one or more targets. Adjusting 370 the orientation of the antennas, may include adjusting the orientation to focus the antennas on a selected airborne target. Presenting 380 target information to a user may include presenting information regarding the position and velocity of one or more targets and other information such as the target location and tracking information 272 described above.

Figure 4:
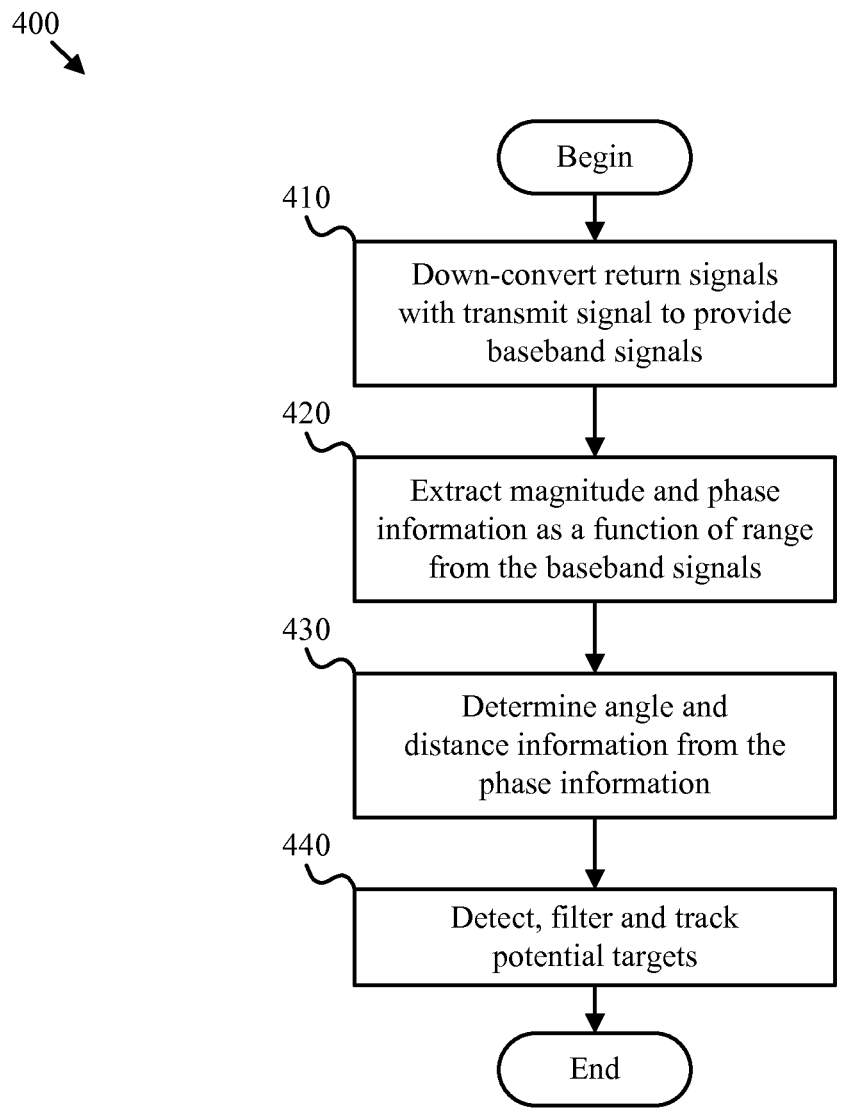
FIG. 4 is a flowchart diagram depicting one embodiment of a return signal processing method.

FIG. 4 is a flowchart diagram depicting one embodiment of a return signal processing method 400. As depicted, the return signal processing method 400 includes down-converting 410 one or more return signals, extracting 420 magnitude and phase information, determining 430 angle and distance information, and detecting, filtering, and tracking 440 one or more potential targets. The processing method 400 is one example of the processing operation 360 shown in FIG. 3.

Down-converting 410 one or more return signals may include demodulating the return signals with a transmit signal to provide baseband signals. Extracting 420 magnitude and phase information may include conducting an FFT operation on each of the baseband signals to provide magnitude and phase information as a function of range (i.e., a return signal magnitude and phase for each range bin).

Determining 430 angle and distance information may include using the phase information for each range bin to estimate an angle and distance to a (possible) reflection point corresponding to the particular range bin. Detecting, filtering, and tracking 440 one or more potential targets may include associating magnitude peaks with a target, filtering out transient peaks, and tracking the movement of the remaining peaks/targets. In some embodiments, the orientation of one or more antennas are adjusted to track a selected target.

Figure 5:
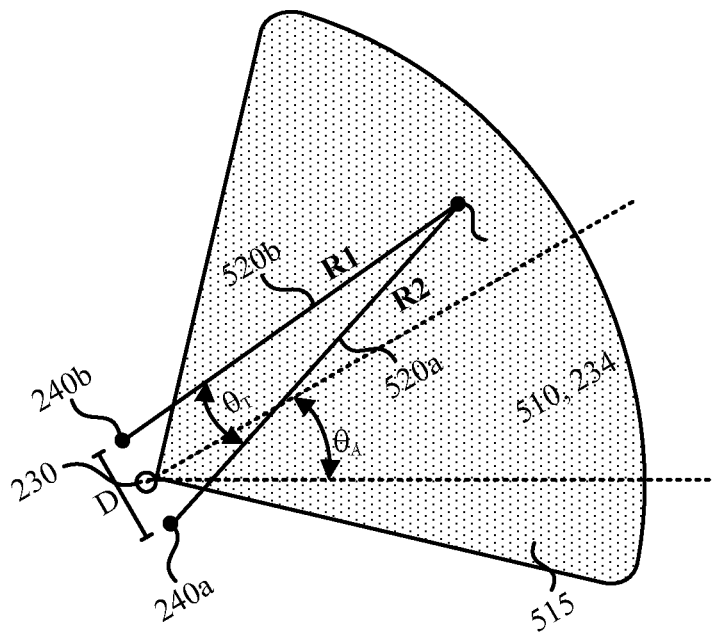
FIG. 5 is a graphical diagram depicting certain aspects of the return signal processing method of FIG. 4.

FIG. 5 is a graphical diagram depicting certain aspects of the return signal processing method of FIG. 4. Using standard geometric relationships, a relative position (R, $\theta_T$) of a target 510 that is illuminated by a beam 515 emitted from a transmit antenna 230, may be calculated by knowing an offset distance D between the return antennas 240*a* and 240*b* along with a first distance 520*a* and a second distance 520*b* to the target 510.

In some embodiments, the first distance 520*a* (i.e., R1) and the second distance 520*b* (i.e., R2) to the target is calculated by resolving the distance range for a range bin corresponding to the target 510 to a specific measured distance using the phase information 262 (as a function of range bin) that is extracted from the return signals corresponding to the return antennas 240*a* and 240*b*. Subsequently, a phase difference Δϕ between the return signals (for a range bin corresponding to the target 510) may be used to calculate the angle $\theta_T$ using the formula shown in FIG. 5. Furthermore, the elevational angle of the antenna array $\theta_A$ may be used with the relative position (R, $\theta_T$) of the airborne target relative to the antenna array to determine the actual distance and elevational angle of the airborne target.

In should be noted that many of the functional units described in this specification have been labeled as modules. Others are assumed to be modules. Modules may be embodied as hardware devices and/or digital processing units with executable instructions such as software or firmware. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented as a processor configured with executable software. An identified module may include executable code that, for instance, comprises one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, the executable code of a module may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference to a computer program product or computer-readable medium may take any non-transitory form capable of causing execution of a program of machine-readable instructions on a digital processing apparatus. For example, a computer-readable medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for determining location information for an airborne target, the apparatus comprising:
    a signal generation module configured to synthesize a cyclic transmit signal having a fixed frequency slope over a substantial portion of each cycle;
    an antenna array comprising at least one transmit antenna configured to emit an electromagnetic beam corresponding to the cyclic transmit signal wherein the electromagnetic beam spans more than 30 degrees in elevation and less than 12 degrees in azimuth;
    the antenna array further comprising at least two receive antennas that are vertically offset and configured to provide a corresponding plurality of vertically offset return signals;
    a down-conversion module configured to down-convert the plurality of vertically offset return signals with the cyclic transmit signal to provide a corresponding plurality of baseband signals;
    a magnitude and phase extraction module configured to receive the plurality of baseband signals and provide magnitude and phase information for each return baseband signal as a function of range;
    a filtering module configured to filter out transient peaks in the magnitude information;
    a target tracking module configured to receive the magnitude and phase information and determine elevation information for an airborne target corresponding to a peak in the magnitude information; and
    wherein the target tracking module is configured to determine azimuthal information for the airborne target in response to physical azimuthal rotation of the antenna array.

2. The apparatus of claim 1, wherein azimuthal information is determined by tracking amplitude variations in the return signal, or a signal corresponding thereto, in response to azimuthal rotation of the antenna array.

3. The apparatus of claim 1, wherein the target tracking module is configured to orientate the antenna array according to the elevation information and the azimuthal information.

4. The apparatus of claim 1, wherein the electromagnetic beam is emitted without up-conversion of the cyclic transmit signal.

5. The apparatus of claim 1, further comprising a behavior filter configured to observe movements of a potential target and thereby determine if the potential target is not an aircraft.

6. The apparatus of claim 1, further comprising a target classification module configured to use microdoppler information to classify the airborne target.

7. A computer-implemented method for determining location information for an airborne target, the method comprising:
   synthesizing a cyclic transmit signal having a fixed frequency slope over a substantial portion of each cycle;
   transmitting an electromagnetic beam corresponding to the cyclic transmit signal wherein the electromagnetic beam spans more than 30 degrees in elevation and less than 12 degrees in azimuth;
   providing a plurality of vertically offset return signals corresponding to at least two receive antennas that are vertically offset;
   down-converting the plurality of vertically offset return signals with the cyclic transmit signal to provide a corresponding plurality of baseband signals;
   determining magnitude and phase information for each vertically offset return signal as a function of range from the corresponding baseband signal;
   filtering out transient peaks in the magnitude information;
   determining elevation information for an airborne target that corresponds to a peak in the magnitude information from the magnitude and phase information; and
   determining azimuthal information for the airborne target in response to physical azimuthal rotation of the antenna array.

8. The method of claim 7, wherein azimuthal information is determined by tracking amplitude variations in the return signal, or a signal corresponding thereto, in response to azimuthal rotation of the receive antennas.

9. The method of claim 7, further comprising orientating the antenna array according to the elevation information and the azimuthal information.

10. The method of claim 7, further comprising observing movements of a potential target to determine if the potential target is not an aircraft.

11. The method of claim 7, further comprising using microdoppler information to classify the airborne target.

12. A non-transitory computer readable medium having computer executable instructions stored thereon that when executed by a digital processing apparatus cause the digital processing apparatus to conduct a method for determining location information for an airborne target, the method comprising:
   synthesizing a cyclic transmit signal having a fixed frequency slope over a substantial portion of each cycle;
   transmitting an electromagnetic beam corresponding to the cyclic transmit signal wherein the electromagnetic beam spans more than 30 degrees in elevation and less than 12 degrees in azimuth;
   providing a plurality of vertically offset return signals corresponding to at least two receive antennas that are vertically offset;
   down-converting the plurality of vertically offset return signals with the cyclic transmit signal to provide a corresponding plurality of baseband signals;
   determining magnitude and phase information for each vertically offset return signal as a function of range from the corresponding baseband signal;
   filtering out transient peaks in the magnitude information;
   determining elevation information for an airborne target that corresponds to a peak in the magnitude information from the magnitude and phase information; and
   determining azimuthal information for the airborne target in response to physical azimuthal rotation of the receive antennas.

13. The computer readable medium of claim 12, wherein azimuthal information is determined by tracking amplitude variations in the return signal, or the signal corresponding thereto, in response to azimuthal rotation of the receive antennas.

14. The computer readable medium of claim 12, wherein the method further comprises orientating the antenna array according to the elevation information and the azimuthal information.

15. The computer readable medium of claim 12, wherein the method further comprises observing movements of a potential target to determine if the potential target is not an aircraft.

16. The computer readable medium of claim 12, wherein the method further comprises using microdoppler information to classify the airborne target.

17. The computer readable medium of claim 12, wherein the electromagnetic beam is transmitted without up-conversion of the cyclic transmit signal.

* * * * *